United States Patent
Balasubramanian et al.

(10) Patent No.: US 11,675,342 B2
(45) Date of Patent: Jun. 13, 2023

(54) AI-BASED SMART HEALTH SURVEILLANCE SYSTEM AND METHOD

(71) Applicant: Noodle Analytics, Inc., San Francisco, CA (US)

(72) Inventors: Ravishankar Balasubramanian, Bengaluru (IN); Ravikant, Jhunjhunu (IN); Abhinav Garg, Karnal (IN)

(73) Assignee: Noodle Analytics, Inc., San Francisco, CA (US)

( * ) Notice: Subject to any disclaimer, the term of this patent is extended or adjusted under 35 U.S.C. 154(b) by 89 days.

(21) Appl. No.: 17/171,977

(22) Filed: Feb. 9, 2021

(65) Prior Publication Data

US 2022/0206480 A1     Jun. 30, 2022

(30) Foreign Application Priority Data

Dec. 24, 2020   (IN) .............................. 202041056316

(51) Int. Cl.
    *G05B 19/418*     (2006.01)
(52) U.S. Cl.
    CPC ... *G05B 19/41875* (2013.01); *G05B 19/4183* (2013.01); *G05B 19/41885* (2013.01)
(58) Field of Classification Search
    CPC .......... G05B 19/41875; G05B 19/4183; G05B 19/41885
    USPC ........................................................ 700/108
    See application file for complete search history.

(56) References Cited

U.S. PATENT DOCUMENTS

| | | | | |
|---|---|---|---|---|
| 2004/0002776 | A1* | 1/2004 | Bickford | G05B 23/0254 700/52 |
| 2006/0224254 | A1* | 10/2006 | Rumi | G05B 13/0275 700/28 |
| 2009/0210081 | A1* | 8/2009 | Sustaeta | H04L 67/125 715/702 |
| 2016/0153806 | A1* | 6/2016 | Ciasulli | G06F 11/26 702/183 |
| 2017/0249554 | A1* | 8/2017 | Zirnstein | G05B 23/0283 |
| 2017/0262756 | A1* | 9/2017 | McElhinney | G08G 9/00 |
| 2019/0340843 | A1* | 11/2019 | McCarson | G07C 3/146 |
| 2022/0019207 | A1* | 1/2022 | Ramachandran | G06N 5/025 |

FOREIGN PATENT DOCUMENTS

| | | | | |
|---|---|---|---|---|
| DE | 112019005467 T5 | * | 7/2021 | ......... G05B 23/0232 |
| GB | 2591772 A | * | 8/2021 | ............ G06Q 10/10 |
| KR | 102101974 B1 | * | 4/2020 | |
| WO | WO-2020253950 A1 | * | 12/2020 | |

* cited by examiner

*Primary Examiner* — Hien D Khuu
(74) *Attorney, Agent, or Firm* — IceMiller LLP (57) ABSTRACT

An AI-based smart asset health surveillance system for a connected system is presented. The connected system includes a plurality of production and/or process lines, wherein each of the plurality of production and/or process lines includes a plurality of assets. The smart asset health surveillance system includes a memory having computer-readable instructions stored therein; and a processor configured to execute the computer-readable instructions. The processor is configured to execute the computer-readable instructions to monitor the plurality of assets and to automatically predict one or more downtime and/or anomalous events for the plurality of assets. An AI-based smart asset health surveillance method is also presented.

20 Claims, 9 Drawing Sheets

AI-BASED SMART HEALTH SURVEILLANCE SYSTEM AND METHOD

PRIORITY STATEMENT

The present application claims priority under 35 U.S.C. § 119 to Indian patent application number 202041056316 filed Dec. 24, 2020, the entire contents of which are hereby incorporated herein by reference

BACKGROUND

Embodiments of the present invention generally relate to AI-based smart health surveillance systems and methods for monitoring assets in connected systems, and more particularly to AI-based smart health surveillance systems and methods for monitoring assets in connected systems to predict unplanned downtime.

Typical industrial plants are connected systems with interdependency of operations between upstream and downstream assets within a processing or a production line. Unplanned downtime within a production or processing line is of concern across these industrial plants and is often the result of errant behavior of an upstream or downstream equipment. Non-limiting examples of causes for unplanned downtime include failure of a critical asset, quality specification of the end product in line not being met, input/output specification of a component not met in a connected system, operational limits (e.g., process, human-safety, equipment-safety, etc.) outside the recommended range, process control parameters not correctly set by operators, and the like.

Unplanned downtime can lead to production loss and/or energy wastage leading to loss of revenue. However, conventional methods for identifying a root cause of unplanned downtime involve manual intervention (e.g., by an operator, process engineer, maintenance engineer, etc.). These methods typically employ a deterministic and rules-based process of elimination, and involve manual analysis and interpretation of data from multiple databases constituting data from: (i) sensors; (ii) scheduling and planning data; (iii) quality reports; (iv) lab test results; (v) alarms from threshold exceptions; (vi) maintenance and repair/replacement records; (vii) process flow (PFD) and process & instrumentation diagrams (P&IDs), to name a few, which can be tedious and time-consuming.

Thus, there is a need for automated systems and methods for monitoring the health of assets in connected systems. Further, there is a need for automated systems and methods for predicting unplanned downtime of assets in connected systems.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, an AI-based smart asset health surveillance system is presented. The system includes a memory having computer-readable instructions stored therein; and a processor configured to execute the computer-readable instructions. The processor is configured to execute the computer-readable instructions to access a connected system having a plurality of production and/or process lines, wherein each of the plurality of production and/or process lines comprises a plurality of assets. The processor is further configured to execute the computer-readable instructions to receive sensor data corresponding to each of the plurality of assets within the plurality of production and/or process lines, wherein the sensor data is indicative of health of each of the plurality of assets. The processor is furthermore configured to execute the computer-readable instructions to identify one or more distinct operating states for each of the plurality of assets corresponding to each of the plurality of production and/or process lines based on at least the sensor data; and develop an asset operating state representation for each of the distinct operating states for each of the plurality of assets to characterize the behavior of the respective asset and a condition of each of the production and/or process lines. The processor is further configured to execute the computer-readable instructions to determine interconnections within the asset operating state representation and establish one or more dependencies between the operating states for each of the plurality of assets corresponding to each of the plurality of production and/or process lines; and classify the interconnections between the operating states as one of strong interconnection and a weak interconnection based on time-occurrence of a plurality of events and/or hierarchy of assets within the production and/or process lines. The processor is furthermore configured to execute the computer-readable instructions to identify one or more warning notifications for the plurality of assets based on the sensor data and the asset operating state representation. The processor is moreover configured to execute the computer-readable instructions to predict one or more downtime and/or anomalous events for the plurality of assets corresponding to each of the plurality of production and/or process lines based on the identified operating states, interconnections between the operating states for the assets, and the one or more warning notifications.

Briefly, according to an example embodiment, an AI-based smart asset health surveillance system is presented. The system includes a memory having computer-readable instructions stored therein; and a processor configured to execute the computer-readable instructions to monitor a plurality of assets of the product manufacturing unit and to automatically predict one or more downtime and/or anomalous events for the plurality of assets, the assets being a part of one or more production and/or process lines of the unit, The processor includes an asset operating state repository configured to store one or more distinct operating states for each of the plurality of assets to characterize the behavior of the respective asset, wherein the asset operating state repository is configured to maintain an asset operating state representation for each of the distinct operating states for the assets. The processor further includes an asset operating state classification module configured to analyze the asset operating state representation and to classify the interconnections between the operating states as one of strong interconnection and a weak interconnection based on time-occurrence of a plurality of events within the production and/or process lines. The processor furthermore includes an asset warning notification module configured to receive sensor data corresponding to one or more events of each of the plurality of production and/or process lines and to identify one or more warning notifications for the plurality of assets based on the sensor data and the asset operating state representation. The processor moreover includes an asset health prediction module configured to predict one or more downtime and/or anomalous events for the plurality of assets corresponding to each of the plurality of production and/or process lines based on the identified operating states, the interconnections between the operating states for the assets, and the warning notifications.

According to another example embodiment, an AI-based smart asset health surveillance method is presented. The method includes accessing a connected system having a plurality of production and/or process lines, wherein each of the plurality of production and/or process lines comprises a plurality of assets. The method further receiving sensor data corresponding to one or more events of each of the plurality of production and/or process lines, wherein the sensor data is indicative of health of each of the plurality of assets. The method furthermore includes identifying one or more distinct operating states for each of the plurality of assets corresponding to each of the plurality of production and/or process lines based on the sensor data; and developing an asset operating state representation for each of the distinct operating states for each of the plurality of assets to characterize the behavior of the respective asset and a condition of each of the production and/or process lines. The method further includes determining interconnections within the asset operating state representation and establish one or more dependencies between the operating states for each of the plurality of assets corresponding to each of the plurality of production and/or process lines; and classifying the interconnections between the operating states as one of strong interconnection and a weak interconnection based on time-occurrence of a plurality of events and/or hierarchy of assets within the production and/or process lines. The method further includes identifying one or more warning notifications for the plurality of assets based on the sensor data and the asset operating state representation. The method moreover includes predicting one or more downtime and/or anomalous events for the plurality of assets corresponding to each of the plurality of production and/or process lines based on the identified operating states, interconnections between the operating states for the assets, and the warning notifications.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for selectively restoring data from a data back-up server. Some embodiments of the present description provide systems and methods for optimally and selectively restoring data from a data back-up server using modified meta-data and data blocks.

Figure 1:
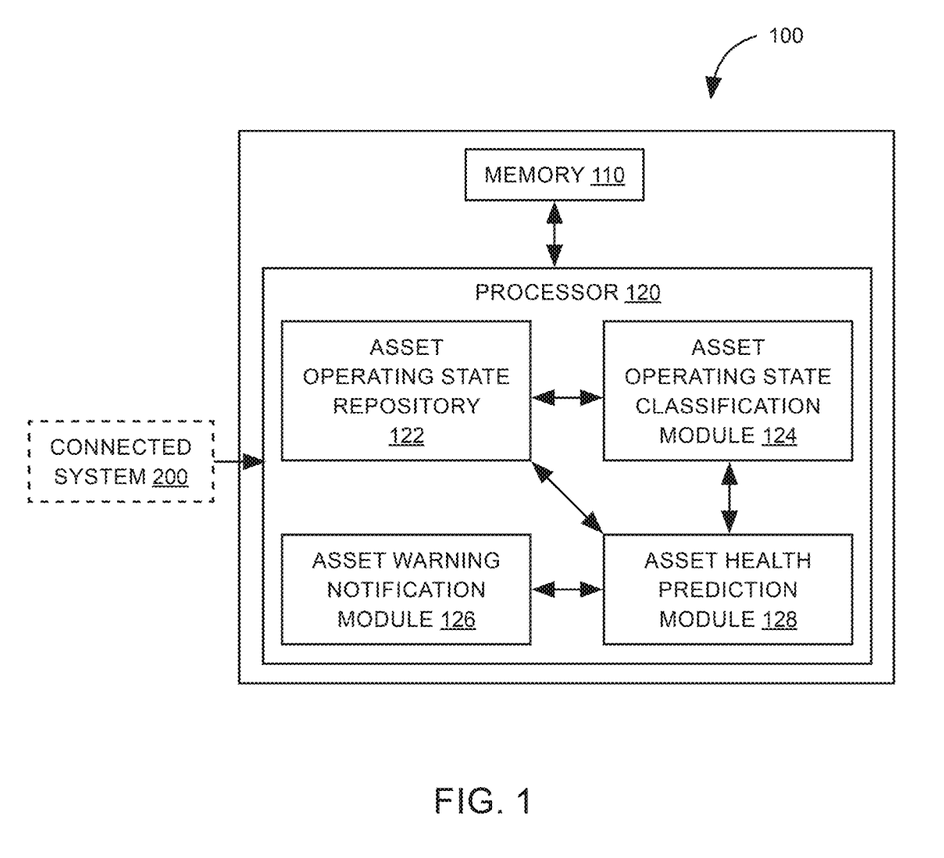
FIG. 1 is a block diagram illustrating an example smart asset health surveillance system, according to some aspects of the present description, FIGS. 2A-2B may be horizontally combined to show different distinct operating states in a connected system identified using an AI-based smart asset health surveillance system, according to some aspects of the present description, FIGS. 3A-3B may be horizontally combined to show different distinct operating states in a connected system identified using an AI-based smart asset health surveillance system, according to some aspects of the present description.

FIG. 1 illustrates an example Artificial Intelligence (AI)-based smart asset health surveillance system 100 (hereinafter referred to as simply "system 100"), in accordance with some embodiments of the present description. The system 100 is operatively coupled to a connected system 200 as shown in FIG. 1. The term "connected system" as used herein refers to an industrial setup including a plurality of components/assets that are operatively interconnected.

The connected system 200 includes a plurality of production and/or process lines, wherein each of the plurality of production and/or process lines includes a plurality of assets. Non-limiting examples of connected systems include at least one of a manufacturing plant, a mill, an industrial set up, an assembly line, or combinations thereof. In some embodiments, the connected system 200 is a product manufacturing unit, a non-limiting example of which includes a steel mill.

The system 100 is configured to monitor the plurality of assets of the connected system 200 and to automatically predict one or more downtime and/or anomalous events for the plurality of assets, the assets being a part of one or more production and/or process lines of the connected system 200. In some embodiments, the system 100 is configured to monitor the plurality of assets of a product manufacturing unit, for example, a steel mill. Non-limiting examples of assets in a connected system include components of a continuous caster production line in a mill, components of a hot strip production line in a steel mill, and the like.

Referring again to FIG. 1, the system 100 includes a memory 110 and a processor 120. The memory 110 has computer-readable instructions stored therein, and the processor 120 is configured to execute the computer-readable instructions to monitor a plurality of assets in a connected system, as described in detail below.

The processor 120 is configured to execute the computer-readable instructions to receive sensor data corresponding to each of the plurality of assets within the plurality of production and/or process lines, wherein the sensor data is indicative of health of each of the plurality of assets.

The processor 120 is further configured to execute the computer-readable instructions to identify one or more distinct operating states for each of the plurality of assets corresponding to each of the plurality of production and/or process lines. Non-limiting examples of distinct operating states include a normal state, an anomalous state, a stoppage state a failure event state, a ramp-up state, a ramp-down state, process-specific operating state(s), or combinations thereof. Non-limiting examples of the process include a compound cast operation called reverse casting (beginning of casting) or tail-out operation, which is the end of a casting process.

In some embodiments, the processor 120 is configured to execute the computer-readable instructions to identify one or more distinct operating states per asset per line per product mix. In some embodiments, the processor 120 is configured to execute the computer-readable instructions to identify, as non-limiting examples in steel mill, one or more distinct operating states per asset per line per product mix per slab cut (or billet or bloom).

The processor 120 is configured to identify the one or more distinct operating states for each of the plurality of assets based on at least the sensor data. In some embodiments, the processor 120 is further configured to identify the one or more distinct operating states for each asset based on at least one of performance data of the respective asset, global planning data of the plurality of production and/or process lines, scheduling data of the plurality of production and/or process lines, and performance data of the plurality of production and/or process lines.

In some embodiments, the processor 120 is configured to identify the one or more distinct operating states for each asset using unsupervised time-series clustering and segmentation techniques. In some embodiments, the processor 120 is configured to identify the one or more distinct operating states for each asset using distance-based metrics, density-based metrics, covariance-based metrics, divergence-based metrics, or model-based methods, and by performing unsupervised time-series clustering with state classification.

In some embodiments, the processor 120 is configured to identify the one or more distinct operating states for each asset using Divergence-based Clustering (DCC), Toeplitz Inverse Covariance Clustering (TICC), Autoregressive Moving Average (ARMA) model, Gaussian mixture models (GMM), hidden Markov models, or combinations thereof.

Referring again to FIG. 1, the processor 120 is further configured to calculate an anomaly score for the plurality of assets corresponding to each of the production and/or process lines based on the sensor data. The anomaly scores as described hereinbelow are used by the processor to identify different distinct operating states using unsupervised time-series clustering and anomaly detection algorithms. The processor 120 is further configured to determine one or more anomalies for the plurality of assets corresponding to each of the production and/or process lines based on the anomaly scores.

Figure 2A:
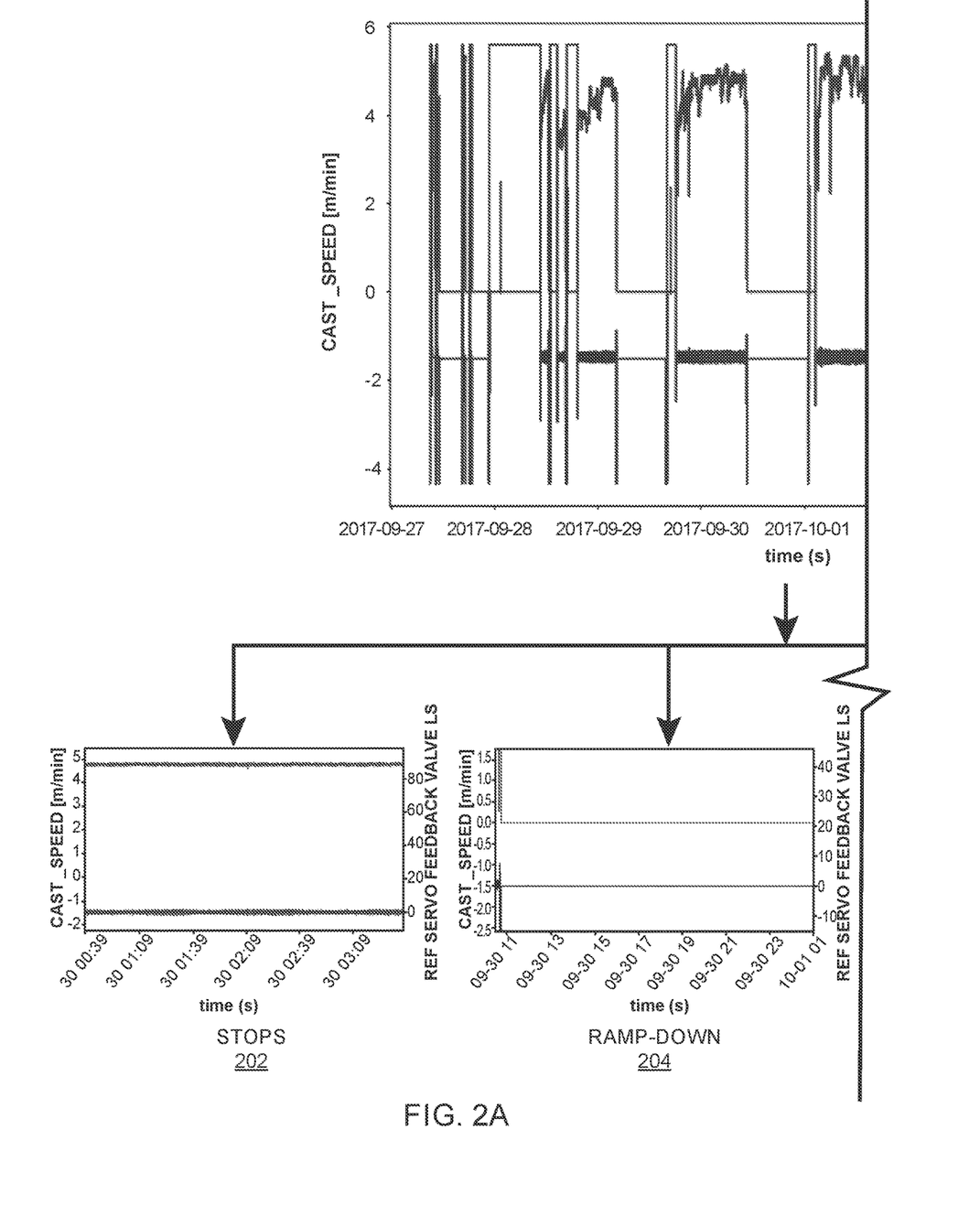
Figure 2B:
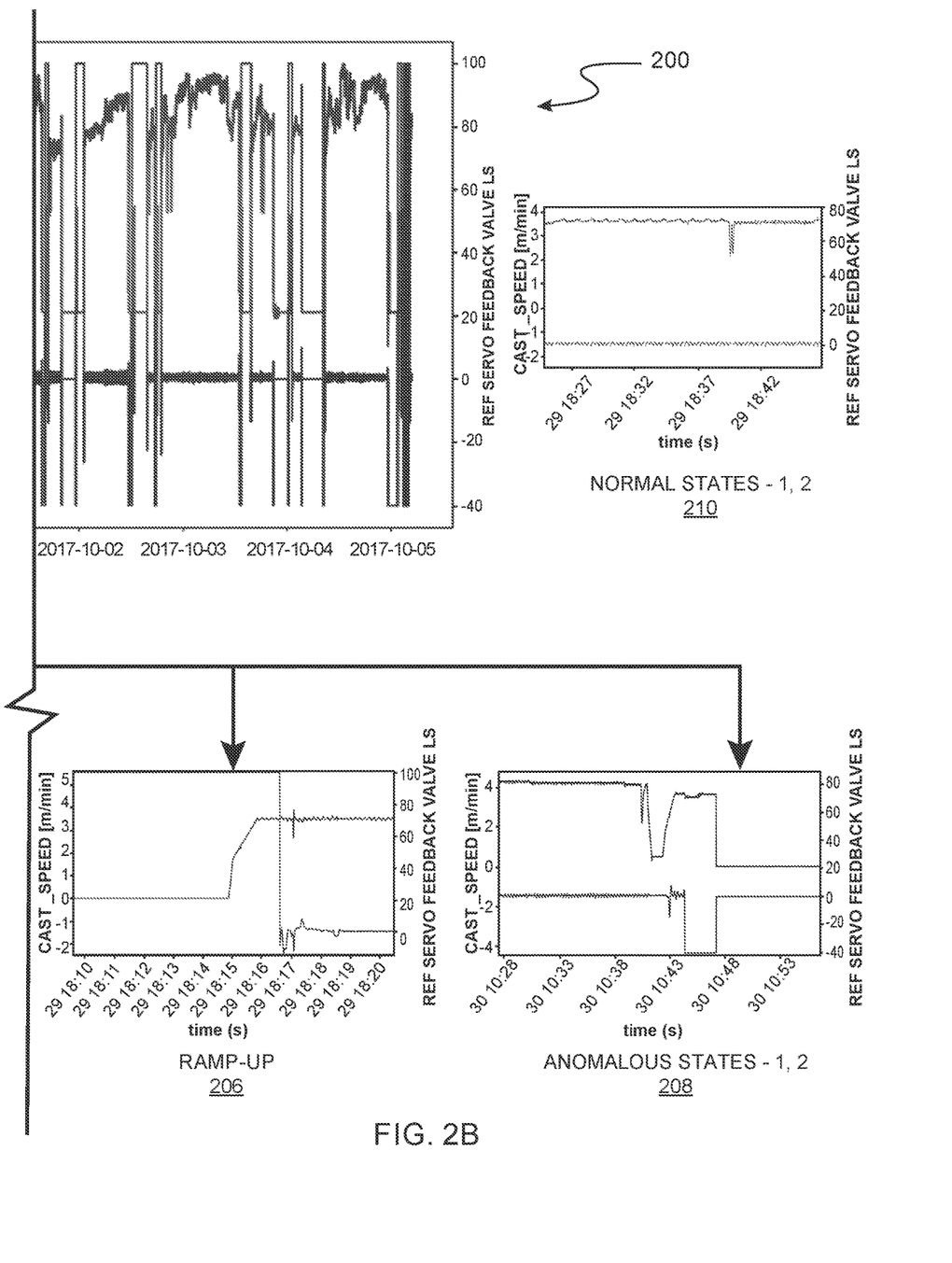

FIGS. 2A-2B show an example embodiment where different distinct operating states in a caster production line of a steel mill are automatically identified by the processor 120 using unsupervised time-series clustering and anomaly detection algorithms. FIGS. 2A-2B illustrate embodiments covering a pinch roll asset operation. As shown in FIGS. 2A-2B, the different operating states such as stops 202, ramp-down 204, ramp-up 206, anomalous states 208, and normal states 210 are automatically identified from casting speed and sensor data 200 using time-series clustering and state classification.

Figure 3A:
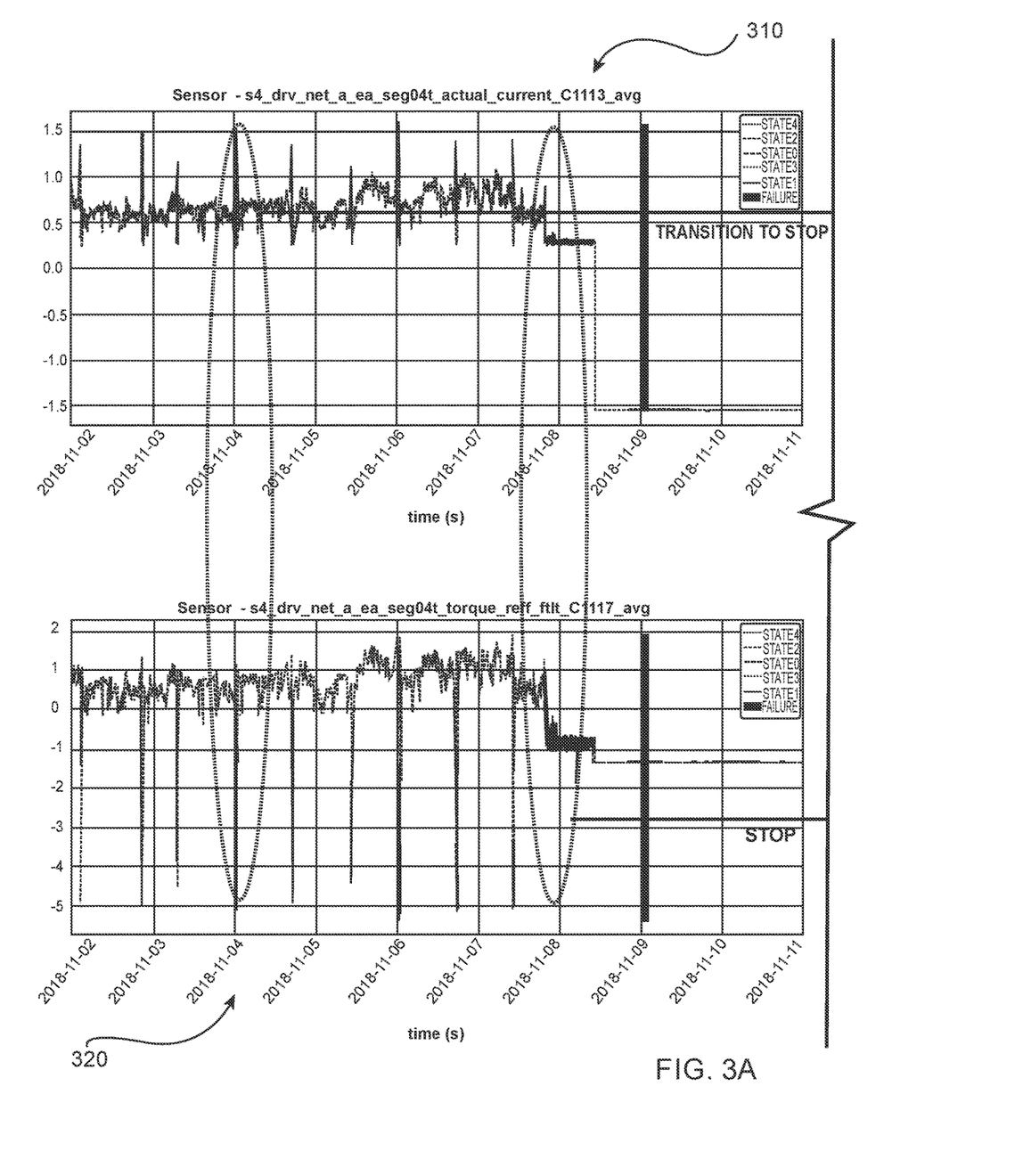
Figure 3B:
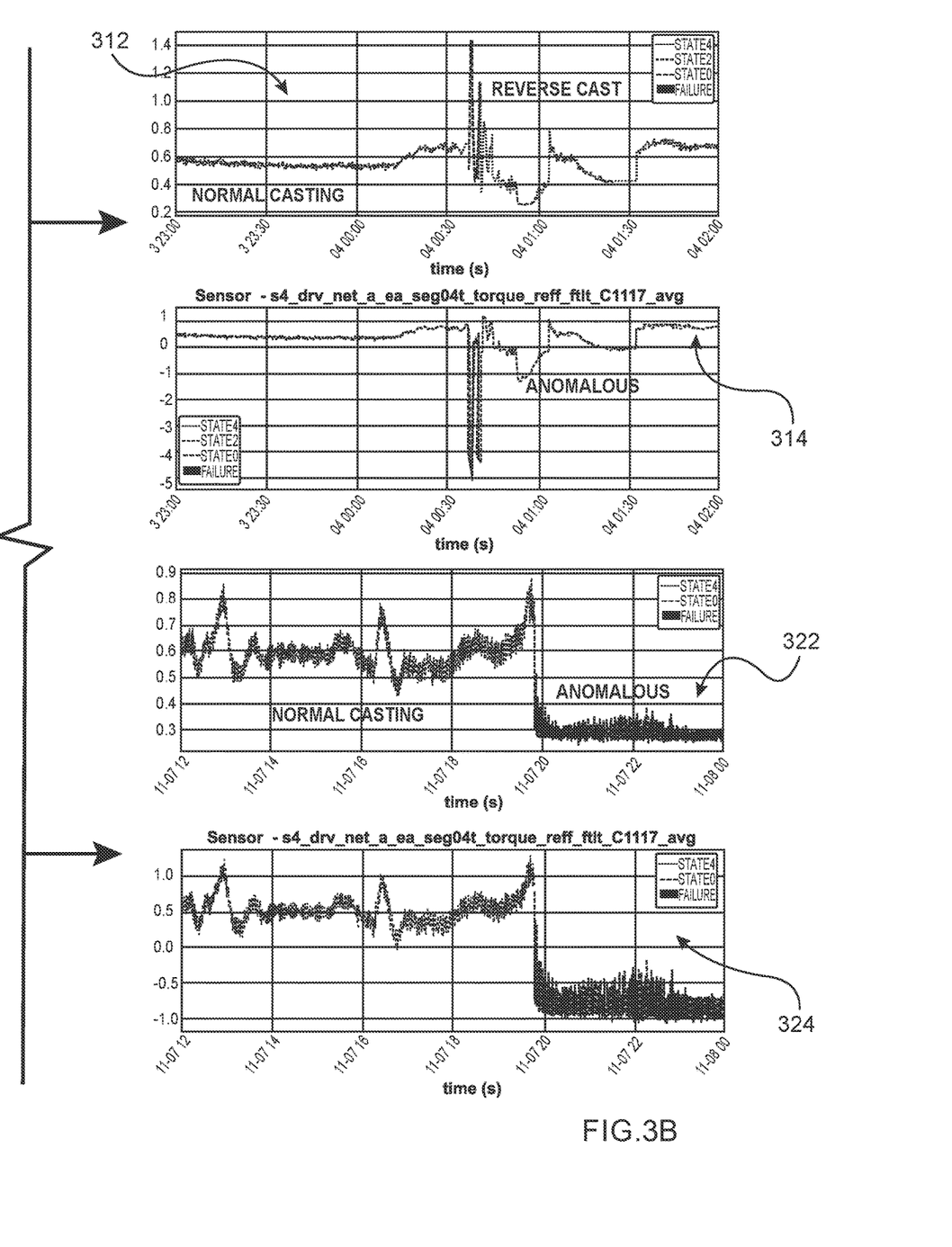

FIGS. 3A-3B show another example embodiment where different distinct operating states in a caster production line of a steel mill are automatically identified by the processor 120 using unsupervised time-series clustering and anomaly detection algorithms. FIGS. 3A-3B illustrate embodiments covering segments (set of rollers in between a hot slab shall pass through) operation. The anomaly behaviors identified in FIGS. 3A-3B are different from those of FIGS. 2A-2B.

FIGS. 3A-3B show normalized signal data for two different sensors data 310 (current) and 320 (torque) for a casting operation. 312 and 322 show the expanded portions of the normalized current and torque signal data 310 and 320, respectively at a first time interval, and 314 and 324 show the expanded portions of the casting data 310 and 320, respectively at a second time interval. As shown in FIGS. 3A-3B, the different operating states (such as normal casting, anomalous, etc.) are identified using time-series clustering and state classification as described in detail below.

Time-series data is often characterized by inter-dependency and correlations between many sensor signals. To understand this complex data, it is useful to label each measurement to one of the unique operational states using time-series clustering. Each state is a segmentation of the time-series into interpretable templates of the operational behavior which can repeat itself many times across the time series. These states capture the complexities of the multi-variate dataset into similar representations. Moreover, this allows for partitioning the measurements in the time series into variable-length patches, where each patch defined by a start-to-end time is a sequence of measurements that belongs to one of the unique operational states.

For example, (i) a stop state is typically characterized by signal behavior with very low or zero variance and flatlining of signals—in this state, mill is not producing and stopped; (ii) "ramp up" and "ramp down" are states that follow/precede a stop state and describes the transitioning operational behavior from/to a stop; (iii) normal state is characterized by very high-density clusters with low anomaly scores and (iv) an anomalous state is characterized by low-density clusters with high anomaly scores, and with proximity to failure/downtime events. FIGS. 2 and 3 are examples of such segmentation, where the time-series data is segmented into various operational or behavioral states.

Figure 4:
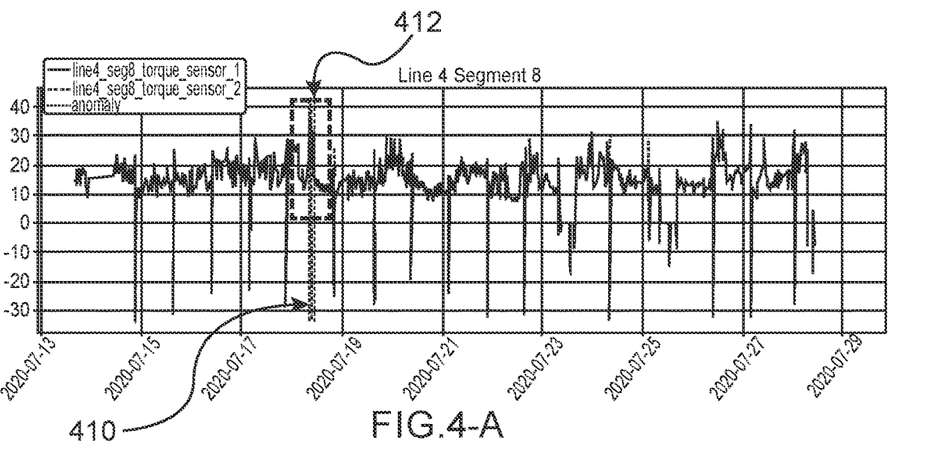
FIGS. 4A-4C show different distinct operating states in a connected system identified using an AI-based smart asset health surveillance system, according to some aspects of the present description.

FIGS. 4A-4C show three operational states across asset locations that are strongly interconnected. FIGS. 4A-4C are snapshots of operational behavior happening at three different locations in a continuous caster production line in a steel mill. The caster has two strands, lines 3 & 4, and segments 1 to 12 besides assets such as mold, turret and tundish. FIG. 4A corresponds to operational behavior at line 4-segment 8, FIG. 4B corresponds to operational behavior at line 4-segment 10, and FIG. 4B corresponds to operational behavior at line 4-segment 11. In FIGS. 4A-4C, x is the time-axis and y-are the normalized values of torque sensor respective to each signal measurement and location. The anomalies for each segment are marked as 410.

The marked box 414 in FIG. 4B highlights the anomalous behavior of torque sensors, as shown by sharp increase in torque values that signify an errant behavior in the line. The anomaly happens at asset location: "line 4-segment 10" for a duration of "X" minutes defined by a "start-to-end time". The asset is "upstream" to line 4-segment 8 and "downstream" to line 4-segment 11 in the caster production line. At the time of this operation, the mill was producing steel slabs of product grade type B with width 800 mm and 20 mm thickness. The knowledge graph for this anomaly is constructed with above details along with the anomaly score, time-series clustered state, anomaly signature pattern match and sensor statistics, etc.

FIGS. 4A and 4C show behavior of torque sensors in the upstream and downstream networks, "line 4-segment 8" and "line 4-segment 11". The sharp spike seen in torque signals highlighted by the boxes 412 and 416 is observed at asset locations, "line 4-segment 8" and "line 4-segment 11" similar to the marked box 414. The knowledge graph for these anomalies was also constructed with their representative operational traits in a similar manner as explained above with reference to FIG. 4B.

The sharp rise in torque at different locations in same line around similar times is used by the graph network to establish a strong-interconnection between the distinct operating states: anomalous state at line 4-segment 8, anomalous state at line 4-segment 10 and anomalous state at line 4-segment 11. Thus, providing a warning to the maintenance engineer highlighting the errant operation that could lead to product quality issues or equipment malfunction leading to downtime in near future.

Figure 5:
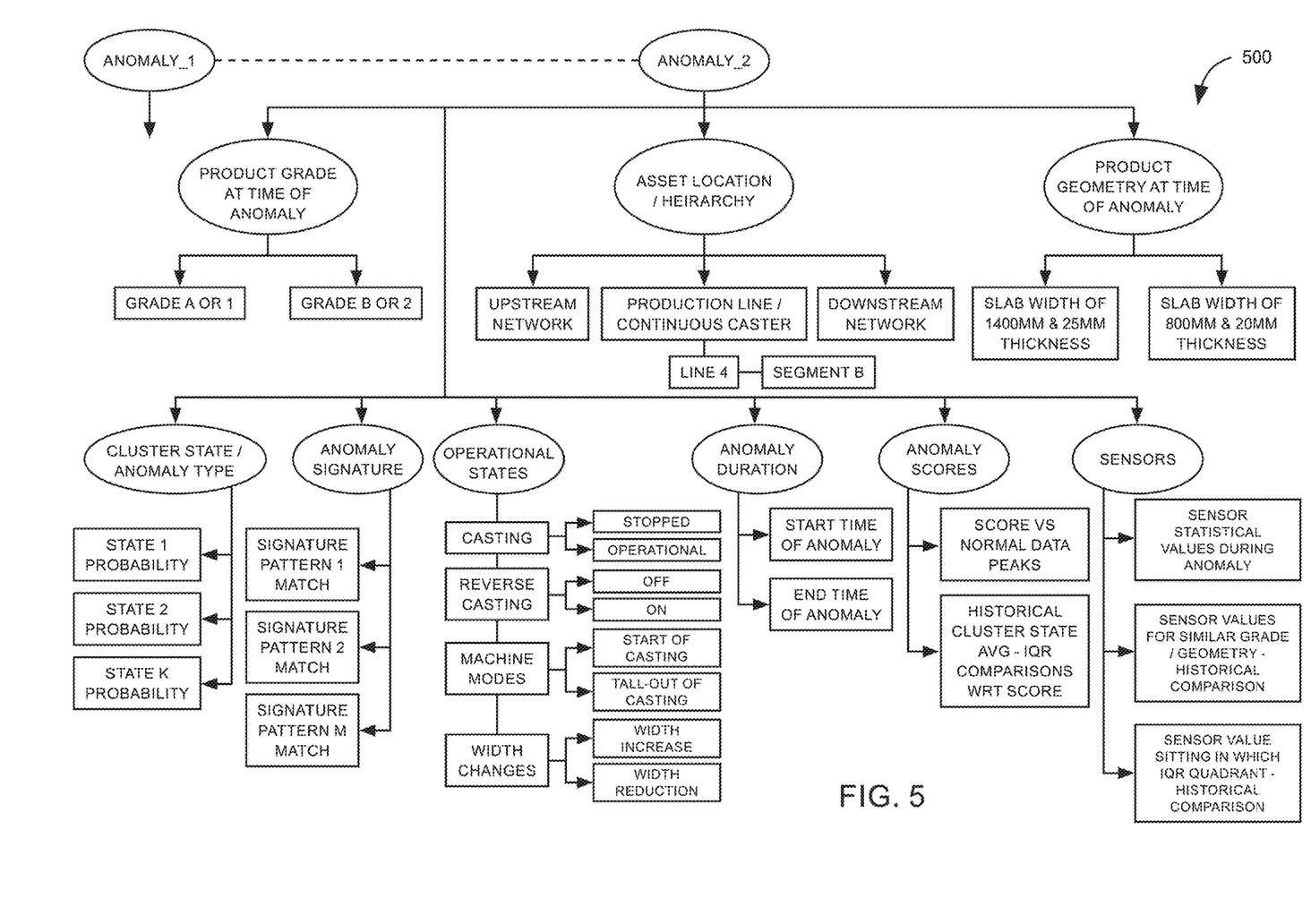
FIG. 5 shows an example asset operating state representation generated using an AI-based smart asset health surveillance system, according to some aspects of the present description.

Referring again to FIG. 1, the processor 120 is further configured to execute the computer-readable instructions to develop an asset operating state representation for each of the distinct operating states for each of the plurality of assets to characterize the behavior of the respective asset and a condition of each of the production and/or process lines. FIG. 5 shows an example asset operating state representation 600 for an anomalous state. FIG. 5 is constructed using a knowledge graph that integrates several behavioral characteristics of an operational state, illustrated here with an anomaly state.

The processor is 120 is further configured to execute the computer-readable instructions to determine interconnections within the asset operating state representation and establish one or more dependencies between the operating states for each of the plurality of assets corresponding to each of the plurality of production and/or process lines. In some embodiments, the interconnection establishes the dependency of one operating state with respect to other operating states.

The processor 120 is configured to execute the computer-readable instructions to classify the interconnections between the operating states as one of strong interconnection and a weak interconnection based on time-occurrence of a plurality of events and/or hierarchy of assets within the production and/or process lines. In some embodiments, the processor 120 is further configured to classify the interconnections between the operating states as one of the strong interconnection and the weak interconnection based on time-occurrence of proximity to alarms, anomalies and stoppages, prioritization to adjacency of assets, or combinations thereof.

In some embodiments, the processor 120 is configured to execute the computer-readable instructions to develop and update the asset operating state representation for each of the distinct operating states for each of the plurality of assets, wherein the asset operating state integrates a plurality of behavioral characteristics of each operating state of the assets.

The processor 120 is further configured to execute the computer-readable instructions to determine multi-level hierarchical interconnections between the operating states for each of the plurality of assets corresponding to the production and/or process line and across multiple lines. In some embodiments, the processor is configured to execute the computer-readable instructions to build multi-level hierarchical interconnections, such as strong and weak, between independent clustered states for assets in a line for a product mix, for assets across multiple lines, for assets across product mixes, and so on.

In some embodiments, the processor 120 is configured to execute the computer-readable instructions to classify the interconnections between the operating states as one of the strong interconnection and the weak interconnection based on hierarchical and network inference algorithms. In some embodiments, the processor 120 is configured to execute the computer-readable instructions to classify the interconnections between the operating states as one of the strong interconnection and the weak interconnection based on deep hierarchical and network inference algorithms.

With continued reference to FIG. 1, the processor 120 is further configured to execute the computer-readable instructions to identify one or more warning notifications for the plurality of assets based on the sensor data and the asset operating representation.

The processor 120 is furthermore configured to execute the computer-readable instructions to predict one or more downtime and/or anomalous events for the plurality of assets corresponding to each of the plurality of production and/or process lines based on the identified operating states, interconnections between the operating states for the assets, and the one or more warning notifications. In some embodiments, the processor 120 is configured to predict one or more downtime and/or anomalous events for the plurality of assets based on sequence-to-sequence models, event prioritization, and causality algorithms.

As noted earlier, embodiments of the present description present an AI-based smart asset health surveillance system that monitors the health of different assets in a connected system, thus reducing downtime. In some embodiments, the processor 120 is configured to execute the computer-readable instructions to communicate the information regarding the predicted downtime events of the assets to reduce the downtime of the corresponding asset. In some embodiments, the information regarding the predicted downtime events of the assets may be communicated to an operator of the assets, a line manager, a maintenance team, and the like.

Referring again to FIG. 1, in some embodiments, the processor 120 further includes a plurality of components configured to execute the computer-readable instructions to monitor the plurality of assets in a connected system, as described herein earlier. As shown in FIG. 1, the processor includes an asset operating state repository 122, an asset operating state classification module 124, an asset warning notification module 126, and an asset health prediction module 128. Each of these components is described further in detail below.

The asset operating state repository 122 is configured to store one or more distinct operating states for each of the plurality of assets to characterize the behavior of the respective asset. Non-limiting examples of distinct operating states include a normal state, an anomalous state, a stoppage state, a downtime state, a failure event state, a ramp-up state, a ramp-down state, or combinations thereof. The one or more distinct operating states may be identified based on sensor data.

The asset operating state repository 122 is further configured to maintain an asset operating state representation for each of the distinct operating states for the assets to characterize the behavior of the respective asset and a condition of each of the production and/or process lines. FIG. 5 shows an example asset operating state representation 600 for an anomalous state.

The asset operating state classification module 124 is operatively coupled to the asset operating state repository 122, and configured to analyze the asset operating state representation. The asset operating state classification module 124 is configured to classify the interconnections between the operating states as one of strong interconnection and a weak interconnection based on time-occurrence of a plurality of events and/or hierarchy of events within the production and/or process lines. In some embodiments, the interconnection establishes the dependency of one operating state with respect to other operating states.

The asset warning notification module 126 is operatively coupled to the asset operating state repository 122, and configured to receive sensor data corresponding to one or more events of each of the plurality of production and/or process lines. The asset warning notification module 126 is further configured to identify one or more warning notifications for the plurality of assets based on the sensor data and the asset operating state representation.

The asset health prediction module is 128 is operatively coupled to the asset operating state repository 122, the asset operating state classification module 124, and the asset warning notification module 126. The asset health prediction module 128 is configured to predict one or more downtime and/or anomalous events for the plurality of assets corresponding to each of the plurality of production and/or process lines based on the identified operating states, the interconnections between the operating states for the assets, and the one or more warning notifications. The processor 120 is further configured to execute the processor-executable routines to perform the steps illustrated in the flowchart of FIG. 5.

Figure 6:
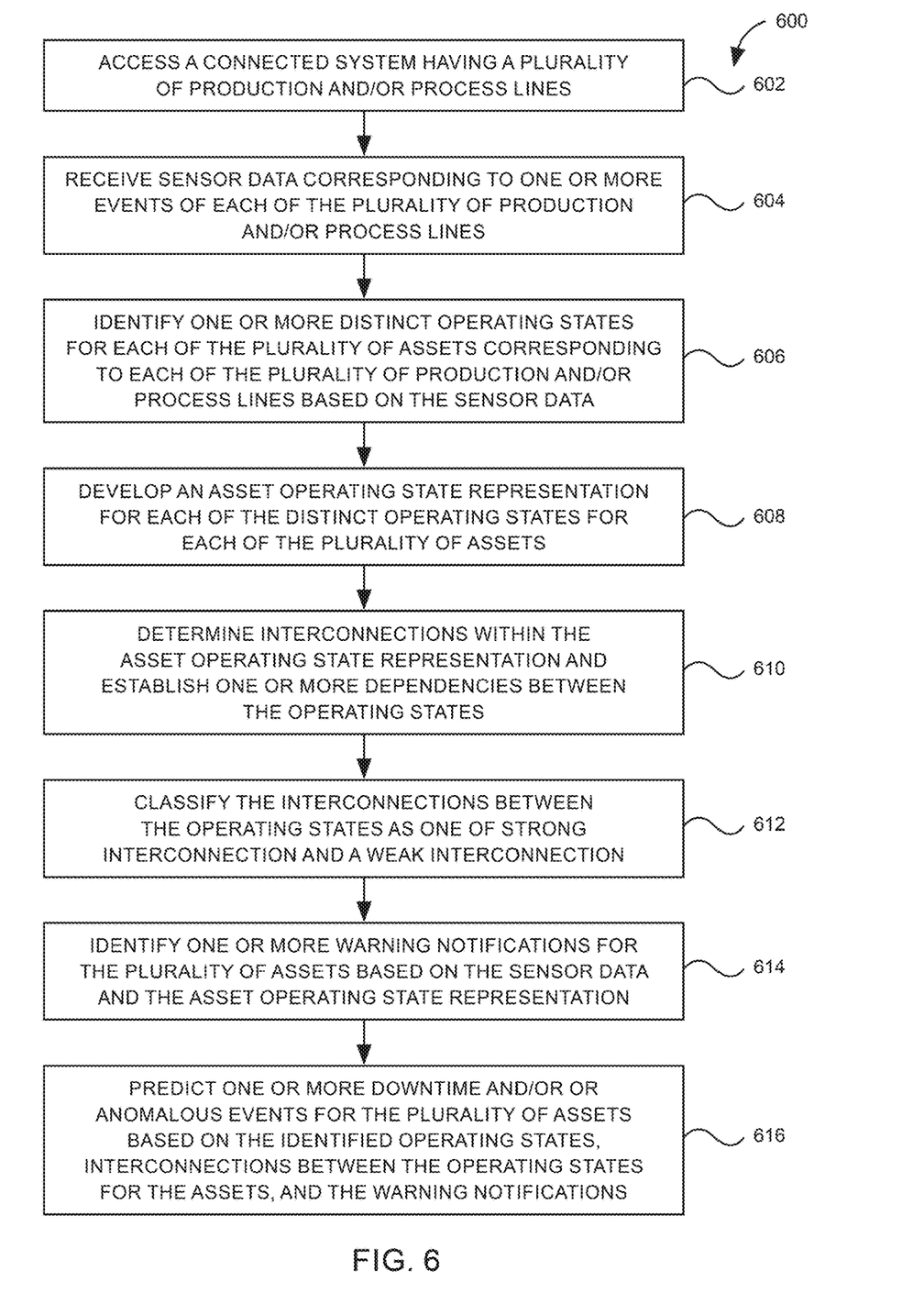
FIG. 6 is a flow chart illustrating an AI-based smart asset health surveillance method, according to some aspects of the present description.

FIG. 6 is a flowchart illustrating an AI-based smart asset health surveillance method 600. The method 600 may be implemented using the system of FIG. 1, according to some aspects of the present description. Each step of the method 600 is described in detail below.

At block 602, the method 600 includes accessing a connected system having a plurality of production and/or process lines, wherein each of the plurality of production and/or process lines includes a plurality of assets. Non-limiting examples of connected systems include at least one of a manufacturing plant, a mill, an industrial set up, an assembly line, or combinations thereof. In some embodiments, the connected system is a product manufacturing unit, non-limiting example of which includes a steel mill.

At block 604, the method 602 includes receiving sensor data corresponding to one or more assets of each of the plurality of production and/or process lines, wherein the sensor data is indicative of health of each of the plurality of assets.

At block 606, the method 600 includes identifying one or more distinct operating states for each of the plurality of assets corresponding to each of the plurality of production and/or process lines. Non-limiting examples of distinct operating states include a normal state, an anomalous state, a stoppage state, a downtime state, a failure event state, a ramp-up state, a ramp-down state, or combinations thereof.

In some embodiments, the one or more distinct operating states are identified per asset per line per product mix. In some embodiments, the one or more distinct operating states are identified per asset per line per product mix per slab cut (or billet or bloom).

The one or more distinct operating states for each of the plurality of assets are identified based on at least the sensor data. In some embodiments, block 606 includes identifying the one or more distinct operating states for each asset based on at least one of performance data of the respective asset, global planning data of the plurality of production and/or process lines, scheduling data of the plurality of production and/or process lines, and performance data of the plurality of production and/or process lines.

In some embodiments, the block 606 includes identifying the one or more distinct operating states for each asset using unsupervised time-series clustering and segmentation techniques. In some embodiments, the one or more distinct operating states for each asset are identified using distance-based metrics, density-based metrics, covariance-based metrics, divergence-based metrics, or model-based methods, and by performing unsupervised time-series clustering with state classification.

In some embodiments, block 606 includes identifying the one or more distinct operating states for each asset using Divergence-based Clustering (DCC), Toeplitz Inverse Covariance Clustering (TICC), Autoregressive Moving Average (ARMA) model, Gaussian mixture models (GMM), hidden Markov models, or combinations thereof.

The method 600 further includes, at block 608, developing an asset operating state representation for each of the distinct operating states for each of the plurality of assets to characterize the behavior of the respective asset and a condition of each of the production and/or process lines.

At block 610, the method 600 includes determining interconnections within the asset operating state representation and establishing one or more dependencies between the operating states for each of the plurality of assets corresponding to each of the plurality of production and/or process lines. In some embodiments, the interconnection establishes the dependency of one operating state with respect to other operating states.

At block 612, the method 600 includes classifying the interconnections between the operating states as one of strong interconnection and a weak interconnection based on time-occurrence of a plurality of events and/or hierarchy of assets within the production and/or process lines. In some embodiments, block 612 includes classifying the interconnections between the operating states as one of strong interconnection and a weak interconnection based on time-occurrence of a plurality of events and/or hierarchy of assets within the production and/or process lines.

In some embodiments, block 612 further includes classifying the interconnections between the operating states as one of the strong interconnection and the weak interconnection based on time-occurrence of proximity to alarms, anomalies, and stoppages, prioritization to adjacency of assets, or combinations thereof.

In some embodiments, block 612 further includes developing and updating the asset operating state representation for each of the distinct operating states for each of the plurality of assets, wherein the asset operating state integrates a plurality of behavioral characteristics of each operating state of the assets. Block 612 may further include building multi-level hierarchical interconnections between the operating states for each of the plurality of assets corresponding to the production and/or process line and across multiple lines. In some embodiments, block 612 includes building multi-level hierarchical interconnections, such as strong and weak, between independent clustered states for assets in a line for a product mix, for assets across multiple lines, for assets across product mixes, and so on.

At block 616, the method 600 includes identifying one or more warning notifications for the plurality of assets based on the sensor data and the asset operating state representation. The method 600 furthermore includes, at block 616, predicting one or more downtime and/or anomalous events for the plurality of assets corresponding to each of the plurality of production and/or process lines based on the identified operating states, interconnections between the operating states for the assets, and the warning notifications.

In some embodiments, the method 600 includes determining one or more anomalies (or anomalous events) for the assets corresponding to each of the production and/or process lines based on the sensor data. The one or more anomalies may be determined based on the sensor data and the asset operating state representation, as described herein earlier.

The method 600 further includes prioritizing the one or more anomalies to generate the one or more warning notifications. The one or more anomalies may be prioritized by generating anomaly scores for the one or more anomalies, in some embodiments. The method 600 furthermore includes utilizing the one or more warning notifications to predict the one or more downtime events along with the identified operating states and interconnections between the operating states (e.g., weak or strong).

Embodiments of the present description provide automated AI-based smart asset health surveillance systems and methods for connected systems based on a systemic approach. These systems and methods leverage machine learning, hierarchical graph networks and artificial intelligence inference models to predict downtime and/or anomalous events for the assets in a connected system, thus reducing unplanned downtime and/or mitigating events that affect quality.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 7:
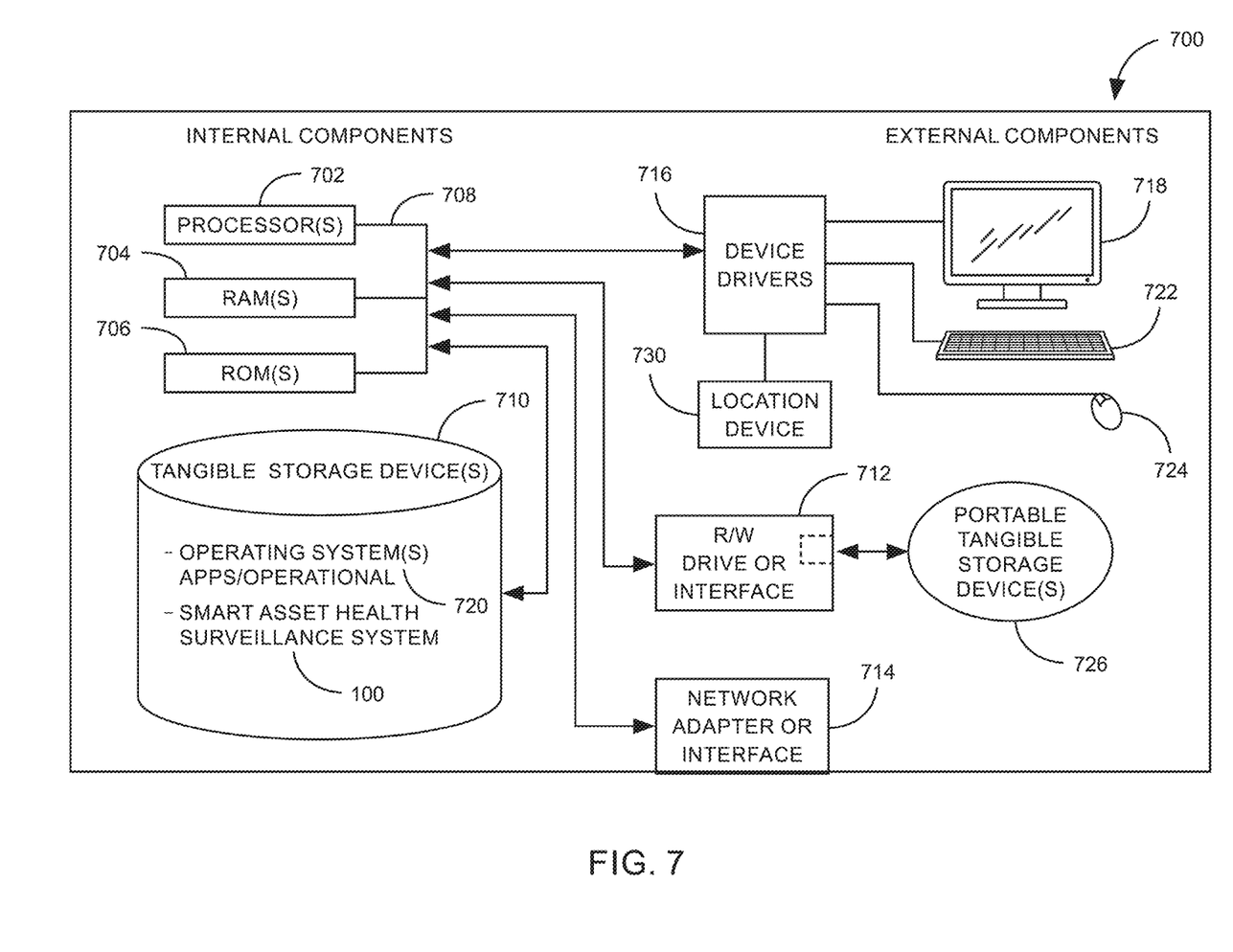
FIG. 7 is a block diagram illustrating an example computer system, according to some aspects of the present description.

One example of a computing system 700 is described below in FIG. 7. The computing system 700 includes one or more processor 702, one or more computer-readable RAMs 704 and one or more computer-readable ROMs 707 on one or more buses 708. Further, the computer system 708 includes a tangible storage device 710 that may be used to execute operating systems 720 and smart asset health surveillance system 100. Both, the operating system 720 and the smart asset health surveillance system 100 are executed by processor 702 via one or more respective RAMs 704 (which typically includes cache memory). The execution of the operating system 720 and/or the smart asset health surveillance system 100 by the processor 702, configures the processor 702 as a special-purpose processor configured to carry out the functionalities of the operation system 720 and/or the AI-based smart asset health surveillance system 100, as described above.

Examples of storage devices 710 include semiconductor storage devices such as ROM 706, EPROM, flash memory or any other computer-readable tangible storage device that may store a computer program and digital information.

Computing system 700 also includes a R/W drive or interface 712 to read from and write to one or more portable computer-readable tangible storage devices 726 such as a CD-ROM, DVD, memory stick or semiconductor storage device. Further, network adapters or interfaces 714 such as a TCP/IP adapter cards, wireless Wi-Fi interface cards, or 3G or 4G wireless interface cards or other wired or wireless communication links are also included in the computing system 700.

In one example embodiment, the smart asset health surveillance system 100 may be stored in tangible storage device 710 and may be downloaded from an external computer via a network (for example, the Internet, a local area network or another wide area network) and network adapter or interface 714.

Computing system 700 further includes device drivers 716 to interface with input and output devices. The input and output devices may include a computer display monitor 718, a keyboard 722, a keypad, a touch screen, a computer mouse 724, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. An AI-based smart asset health surveillance system, comprising:
a memory having computer-readable instructions stored therein;
a processor configured to execute the computer-readable instructions to:
access a connected system having a plurality of production and/or process lines, wherein each of the plurality of production and/or process lines comprises a plurality of assets;
receive sensor data corresponding to each of the plurality of assets within the plurality of production and/or process lines, wherein the sensor data is indicative of health of each of the plurality of assets;
identify one or more distinct operating states for each of the plurality of assets corresponding to each of the plurality of production and/or process lines based on at least the sensor data;
develop an asset operating state representation for each of the distinct operating states for each of the plurality of assets to characterize the behavior of the respective asset and a condition of each of the production and/or process lines;
determine interconnections within the asset operating state representation and establish one or more dependencies between the operating states for each of the plurality of assets corresponding to each of the plurality of production and/or process lines;
classify the interconnections between the operating states as one of strong interconnection and a weak interconnection based on time-occurrence of a plurality of events and/or hierarchy of assets within the production and/or process lines;
identify one or more warning notifications for the plurality of assets based on the sensor data and the asset operating state representation; and
predict one or more downtime and/or anomalous events for the plurality of assets corresponding to each of the plurality of production and/or process lines based on the identified operating states, interconnections between the operating states for the assets, and the one or more warning notifications.

2. The AI-based smart asset health surveillance system of claim 1, wherein the processor is configured to execute the computer-readable instructions to identify the one or more distinct operating states for each asset based on at least one of performance data of the respective asset, global planning data of the plurality of production and/or process lines, scheduling data of the plurality of production and/or process lines, and performance data of the plurality of production and/or process lines.

3. The AI-based smart asset health surveillance system of claim 2, wherein the processor is configured to execute the computer-readable instructions to identify the one or more distinct operating states for each asset using unsupervised time-series clustering, state classification, and anomaly detection techniques.

4. The AI-based smart asset health surveillance system of claim 3, wherein the processor is configured to execute the computer-readable instructions to identify the one or more distinct operating states for each asset using distance-based metrics, density-based metrics, covariance-based metrics, divergence-based metrics, or model-based methods.

5. The AI-based smart asset health surveillance system of claim 4, wherein the processor is configured to execute the computer-readable instructions to identify the one or more distinct operating states for each asset using Divergence-based Clustering (DCC), Toeplitz Inverse Covariance Clustering (TICC), Autoregressive Moving Average (ARMA) model, Gaussian mixture (GMM) models, hidden Markov models, or combinations thereof.

6. The AI-based smart asset health surveillance system of claim 2, wherein the processor is configured to execute the computer-readable instructions to identify at least one of a normal state, an anomalous state, a stoppage state, a failure event state, a ramp-up state, a ramp-down state, or combinations thereof.

7. The AI-based smart asset health surveillance system of claim 2, wherein the processor is configured to execute the computer-readable instructions to classify the interconnections between the operating states as one of the strong interconnection and the weak interconnection based on time-occurrence of proximity to alarms, anomalies and stoppages, prioritization to adjacency of assets, or combinations thereof.

8. The AI-based smart asset health surveillance system of claim 1, wherein the processor is configured to execute the computer-readable instructions to:
calculate an anomaly score for the plurality of assets corresponding to each of the production and/or process lines based on the sensor data; and
determine one or more anomalies for the plurality of assets corresponding to each of the production and/or process lines based on the anomaly scores.

9. The AI-based smart asset health surveillance system of claim 8, wherein the processor is configured to execute the computer-readable instructions to:
prioritize the one or more anomalies based on corresponding anomaly scores to generate the one or more warning notifications; and
utilize the one or more warning notifications to predict the one or more downtime events and/or anomalous events.

10. The AI-based smart asset health surveillance system of claim 1, wherein the processor is configured to execute the computer-readable instructions to develop and update the asset operating state representation for each of the distinct operating states for each of the plurality of assets, wherein the asset operating state representation integrates a plurality of behavioral characteristics of each operating state of the assets.

11. The AI-based smart asset health surveillance system of claim 1, wherein the processor is configured to execute the computer-readable instructions to determine multi-level hierarchical interconnections between the operating states for each of the plurality of assets corresponding to the production and/or process line and across multiple lines.

12. The AI-based smart asset health surveillance system of claim 1, wherein the connected system comprises at least one of a manufacturing plant, a mill, an industrial set up, an assembly line, or combinations thereof.

13. The AI-based smart asset health surveillance system of claim 1, wherein the processor is configured to execute the computer-readable instructions to communicate the information regarding the predicted downtime events of the assets to reduce the downtime of the corresponding asset.

14. An AI-based smart asset health surveillance system for a product manufacturing/process unit, the AI-based smart asset health surveillance system comprising:
a memory having computer-readable instructions stored therein; and a processor configured to execute the computer-readable instructions to:
   monitor a plurality of assets of the product manufacturing/process unit;
   automatically predict one or more downtime and/or anomalous events for the plurality of assets, the assets being a part of one or more production and/or process lines of the unit;
   store one or more distinct operating states for each of the plurality of assets to characterize the behavior of the respective asset;
   maintain an asset operating state representation for each of the distinct operating states for the assets;
   analyze the asset operating state representation and to classify the interconnections between the operating states as one of strong interconnection and a weak interconnection based on time-occurrence of a plurality of events within the production and/or process lines;
   receive sensor data corresponding to one or more events of each of the plurality of production and/or process lines and to identify one or more warning notifications for the plurality of assets based on the sensor data and the asset operating state representation; and
   predict one or more downtime and/or anomalous events for the plurality of assets corresponding to each of the plurality of production and/or process lines based on the identified operating states, the interconnections between the operating states for the assets, and the warning notifications.

15. The AI-based smart asset health surveillance system of claim 14, wherein the product manufacturing/process unit comprises at least one of a manufacturing plant, a mill, an industrial set up, an assembly line, or combinations thereof.

16. The AI-based smart asset health surveillance system of claim 14, wherein the processor is further configured to:
   determine interconnections within the asset operating state representation; and
   establish one or more dependencies between the operating states for each of the plurality of assets corresponding to each of the plurality of production and/or process lines.

17. The AI-based smart asset health surveillance system of claim 14, wherein the one or more distinct operating states comprise at least one of a normal state, an anomalous state, a stoppage state, a downtime state, a failure event state, a ramp-up state, a ramp-down state, or combinations thereof.

18. The AI-based smart asset health surveillance system of claim 14, wherein the processor is further configured to:
   calculate an anomaly score for the plurality of assets corresponding to each of the production and/or process lines based on the sensor data;
   determine one or more anomalies for the plurality of assets corresponding to each of the production and/or process lines based on the anomaly scores; and
   prioritize the one or more anomalies based on corresponding anomaly scores to generate the one or more warning notifications.

19. An AI-based smart asset health surveillance method, the method comprising:
   accessing a connected system having a plurality of production and/or process lines, wherein each of the plurality of production and/or process lines comprises a plurality of assets;
   receiving sensor data corresponding to one or more assets of each of the plurality of production and/or process lines, wherein the sensor data is indicative of health of each of the plurality of assets;
   identifying one or more distinct operating states for each of the plurality of assets corresponding to each of the plurality of production and/or process lines based on the sensor data;
   developing an asset operating state representation for each of the distinct operating states for each of the plurality of assets to characterize the behavior of the respective asset and a condition of each of the production and/or process lines;
   determining interconnections within the asset operating state representation and establish one or more dependencies between the operating states for each of the plurality of assets corresponding to each of the plurality of production and/or process lines;
   classifying the interconnections between the operating states as one of strong interconnection and a weak interconnection based on time-occurrence of a plurality of events and/or hierarchy of assets within the production and/or process lines;
   identifying one or more warning notifications for the plurality of assets based on the sensor data and the asset operating state representation; and
   predicting one or more downtime and/or anomalous events for the plurality of assets corresponding to each of the plurality of production and/or process lines based on the identified operating states, interconnections between the operating states for the assets, and the warning notifications.

20. The AI-based smart asset health surveillance method of claim 19, further comprising:
   calculating an anomaly score for the plurality of assets corresponding to each of the production and/or process lines based on the sensor data;
   determining one or more anomalies for the plurality of assets corresponding to each of the production and/or process lines based on the anomaly scores;
   prioritizing the one or more anomalies based on corresponding anomaly scores to generate the one or more warning notifications; and
   utilizing the one or more warning notifications to predict the one or more downtime events and/or anomalous events.

* * * * *